Patented Sept. 14, 1926.

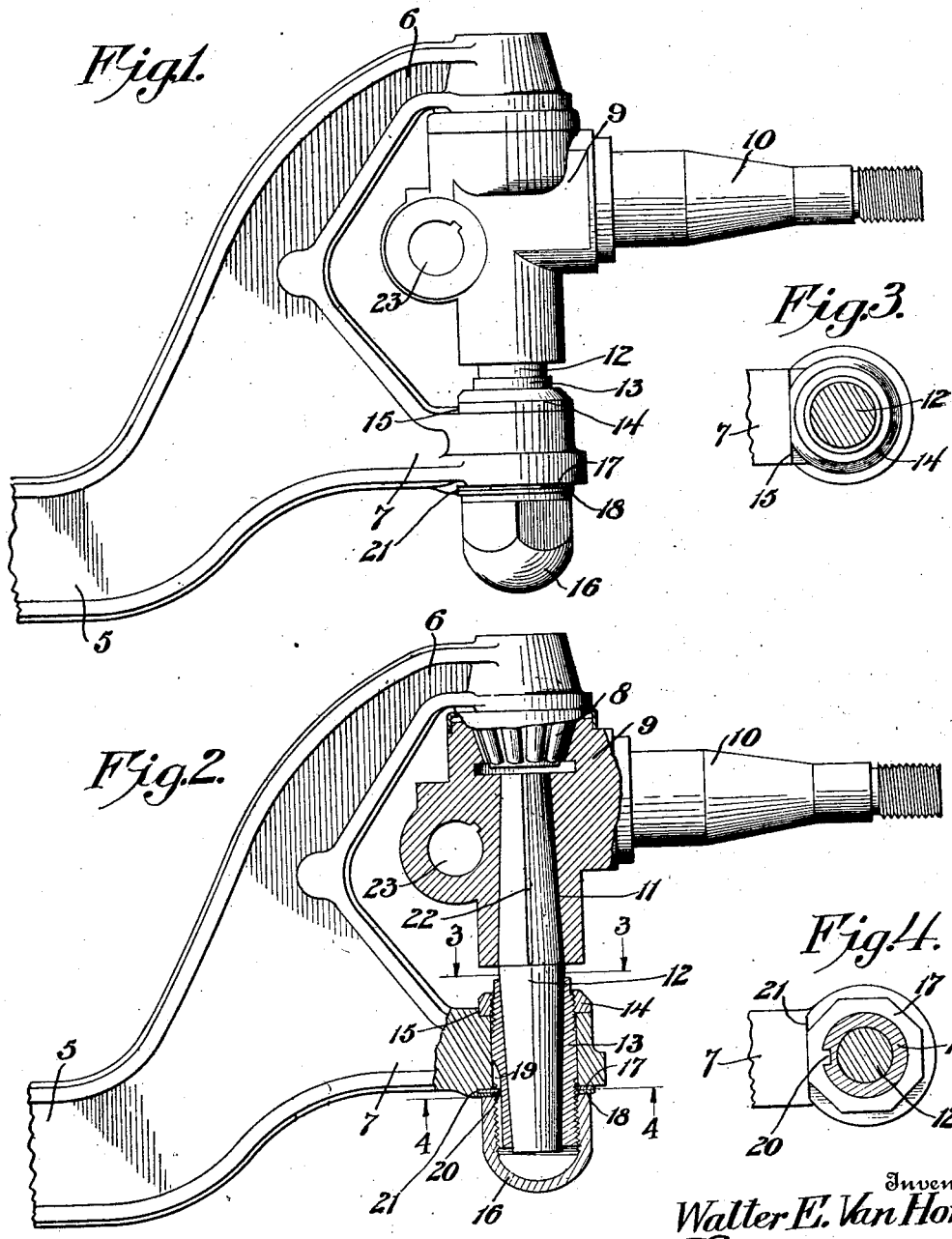

1,599,442

UNITED STATES PATENT OFFICE.

WALTER EVERETT VAN HORN, OF CLARKSBURG, WEST VIRGINIA.

STEERING-KNUCKLE MOUNTING.

Application filed March 1, 1926. Serial No. 91,462.

This invention relates to a steering knuckle mounting, adapted to be used on automobiles and the like for connecting the knuckle to the front axle tree.

In the usual automobile construction, the steering knuckle, which is made integral with the wheel spindle, is mounted on a vertical bolt or spindle, and is oscillatable about a vertical axis in the end of the axle tree which it supports. When this vertical spindle or its bearing becomes worn, the worn parts must be entirely replaced in order to prevent the wheel from wabbling. This entails a great deal of expense, and a considerable amount of labor.

The general object of the present invention is to provide an improved mounting for the knuckle, which is so constructed that it may, with a minimum amount of labor, be quickly adjusted to compensate for wear without replacing any of the parts.

The details of the construction by which this object is attained, and the manner of adjusting the same, will be fully explained in connection with the accompanying drawing illustrating the preferred embodiment of the invention.

In the drawing:

Figure 1 is a front elevation of a steering knuckle with the invention embodied therein.

Figure 2 is a vertical sectional view of the same.

Figure 3 is a detail horizontal section on the line 3—3 of Figure 2.

Figure 4 is a detail horizontal section on the line 4—4 of Figure 2, looking upward.

The invention is shown in connection with the front axle tree 5, formed with upper and lower arms 6 and 7, respectively. The upper arm 6 rests upon roller bearings 8 which support most of the weight. The roller bearings are mounted in the upper end of a steering knuckle 9, which is formed with a laterally projecting wheel spindle 10.

The knuckle 9 is formed with a bore 11, which is upwardly tapered throughout its length, and which receives the upper portion of a vertical spindle 12. The spindle 12 is tapered in opposite directions from its middle to its ends, and the lower portion of the spindle is mounted in a bushing 13. The inner surface of this bushing is tapered to correspond with the spindle 12, but its outer surface is substantially cylindrical, and is received in a vertical bore formed in the arm 7. The bushing 13 is formed with threads at each end, and its upper end is adapted to receive a threaded collar 14, which is flattened at one side, and is seated against a shoulder 15 formed on the arm 7, so that the collar is held against rotation. The threaded lower end of the bushing 13 receives a nut 16, which also forms a cap, covering the lower end of the bushing and the tapered spindle. Two washers 17 and 18, respectively, are interposed between the cap 16 and the lower surface of the arm 7 against which it seats. The washer 17 is polygonal in shape, and the bushing 13 is formed with a keyway 19, which receives a lug 20 projecting inwardly from the washer.

Normally, when the bushing 13 is secured in proper position by the collar 14 at the upper end and the cap 16 at the lower end, the washer 17 is seated against the lower face of the arm 7, and one of its flat edges engages a shoulder 21 on the arm 7 to lock the washer 17 and likewise the bushing 13 against rotation. When assembling the parts, the bushing 13 may be screwed into the collar 14 by means of a wrench applied to the washer 17, the latter being at this time free from the shoulder 21. As soon as the cap 16 is put on, however, the washer 17 is forced against its seat, and the bushing 13 becomes locked in the position to which it is adjusted.

The spindle 17 may be provided with an oil groove 22, and the knuckle 9 is formed with a horizontal bore 23 to receive an arm which projects rearwardly, and is connected to the steering knuckle at the other side in the usual manner.

The spindle 12 may turn either in the knuckle 9 or in the bushing 13. If the spindle 12 or its bearings become worn so that the steering knuckle has too much play, all that it is necessary to do in order to compensate for the wear is to adjust the bushing 13 vertically. This may be done in just a few moments. The cap 19 needs to be unscrewed only far enough to permit the washer 17 to drop below the shoulder 21. A wrench may then be applied to the washer, and the bushing 13 may be turned as much as is necessary to draw it up until there is no more play in the knuckle. It is not necessary to replace any of the parts. By taking up the bushing slightly from time to time, the knuckle may always be held without any play, and the knuckle and parts associated therewith will last as long as the life of the automobile.

While I have shown and described in detail one embodiment of the invention, it is apparent that the same may be modified to adapt it to various makes of automobiles without any material departure from the salient features of the invention as expressed in the claims.

What is claimed is:

1. In a device of the character described, the combination with a spindle tapered from an intermediate point toward each end, of a knuckle having a tapered bore receiving one end of said spindle, a supporting member including a bushing having a tapered bore receiving the other end of said spindle, a collar threaded on one end of the bushing, means for seating the collar and holding it against rotation, means for rotating the bushing in the collar to adjust it toward or away from the knuckle, and means for locking the bushing in its adjusted position.

2. In a device of the character described, the combination of a spindle tapered from an intermediate point toward each end, of a knuckle having a tapered member receiving one end of said spindle, a bushing having a tapered bore receiving the other end of said spindle, a collar threaded on one end of the bushing, means for seating the collar and holding it against rotation, a washer keyed to said bushing and polygonal in shape so that it is adapted to receive a wrench for adjusting the bushing longitudinally, a shoulder against which one end of the washer may be seated to lock the washer and bushing when the latter has received the desired adjustment, and a nut threaded on the bushing to hold the washer against its seat, but rotatable to release the washer so that the bushing may be adjusted.

3. In a device of the character described, the combination with an axle tree terminating in an upper and a lower arm, of a member supported by said lower arm and having a vertical downwardly tapered bore, a spindle having a downwardly tapered end seated in said bore, the other end of the spindle being upwardly tapered, a steering knuckle having an upwardly tapered bore receiving said upwardly tapered end, and means for decreasing the distance between the knuckle and the member supported by the lower arm to compensate for wear between them and said spindle.

4. In a device of the character described, the combination with an axle tree terminating in an upper and a lower arm, of a vertically disposed bushing supported by said lower arm and having a downwardly tapered bore, a spindle having a downwardly tapered end seated in said bore, the other end of the spindle being upwardly tapered, a steering knuckle having an upwardly tapered bore receiving said upwardly tapered end, a collar threaded on the upper end of the bushing, means on said lower arm for seating the collar and holding it against rotation, means for rotating the bushing in the collar to adjust it toward or away from the knuckle, and means for locking the bushing in its adjusted position.

5. In a device of the character described, the combination with an axle tree terminating in an upper and a lower arm, of a vertically disposed bushing supported by said lower arm and having a downwardly tapered bore, a spindle having a downwardly tapered end seated in said bore, the other end of the spindle being upwardly tapered, a steering knuckle having an upwardly tapered bore receiving said upwardly tapered end, a collar threaded on the upper end of the bushing, means on said lower arm for seating the collar and holding it against rotation, a washer keyed to the lower end of the bushing and polygonal in shape so that it is adapted to receive a wrench for adjusting the bushing vertically, a shoulder formed on the lower side of the lower arm against which one edge of the washer may be seated to lock the washer and bushing when the latter has received the desired adjustment, and a nut threaded on the lower end of the bushing to hold the washer against its seat, but rotatable to release the washer so that the bushing may be adjusted.

In testimony, that I claim the foregoing as my own, I have hereto affixed my signature.

WALTER EVERETT VAN HORN.